(12) United States Patent
Ekestubbe

(10) Patent No.: US 12,130,040 B2
(45) Date of Patent: Oct. 29, 2024

(54) THERMAL HEATING SYSTEM AND A CONTROLLER FOR THE SAME

(71) Applicant: E.ON SVERIGE AB, Malmo (SE)

(72) Inventor: Jonas Ekestubbe, Lund (SE)

(73) Assignee: E.ON SVERIGE AB, Malmo (SE)

( * ) Notice: Subject to any disclaimer, the term of this patent is extended or adjusted under 35 U.S.C. 154(b) by 796 days.

(21) Appl. No.: 17/255,250

(22) PCT Filed: Jun. 19, 2019

(86) PCT No.: PCT/EP2019/066153
§ 371 (c)(1),
(2) Date: Dec. 22, 2020

(87) PCT Pub. No.: WO2020/007608
PCT Pub. Date: Jan. 9, 2020

(65) Prior Publication Data
US 2021/0131677 A1    May 6, 2021

(30) Foreign Application Priority Data
Jul. 3, 2018    (EP) .................................... 18181409

(51) Int. Cl.
| | | |
|---|---|---|
| *F24F 11/85* | (2018.01) | |
| *F24D 3/02* | (2006.01) | |
| *F24D 3/10* | (2006.01) | |
| *F24D 5/02* | (2006.01) | |
| *F24D 11/00* | (2022.01) | |
| *F24T 10/15* | (2018.01) | |

(52) U.S. Cl.
CPC ................ *F24F 11/85* (2018.01); *F24D 3/02* (2013.01); *F24D 3/10* (2013.01); *F24D 5/02* (2013.01); *F24D 11/006* (2013.01); *F24T 10/15* (2018.05)

(58) Field of Classification Search
CPC . F24F 11/85; F24T 10/15; F24T 10/13; F24T 10/17; F24T 10/30; F24D 3/02;
(Continued)

(56) References Cited

U.S. PATENT DOCUMENTS

| | | | |
|---|---|---|---|
| 10,345,051 B1 * | 7/2019 | Halloran | ............... F28D 1/0477 |
| 2011/0114284 A1 * | 5/2011 | Siegenthaler | ........... F28F 27/00 |
| | | | 165/45 |

(Continued)

FOREIGN PATENT DOCUMENTS

| | | | | |
|---|---|---|---|---|
| AT | 522581 B1 * | 12/2020 | ............. | F24T 10/15 |
| CA | 2584770 A1 * | 10/2008 | ............ | F24F 5/0046 |

(Continued)

OTHER PUBLICATIONS

"DE-1492360-A1—Machine Translation.pdf", Machine Translation, EPO.org, Sep. 30, 2023. (Year: 2023).*

(Continued)

*Primary Examiner* — Steven B McAllister
*Assistant Examiner* — John E Bargero
(74) *Attorney, Agent, or Firm* — Knobbe, Martens, Olson & Bear, LLP

(57) ABSTRACT

A system comprising a main circuit for routing a flow of heat transfer liquid out of a thermal storage to at least one outer heat exchanger and back to the thermal storage again, a main circulation pump configured to force the heat transfer liquid through the main circuit, a temperature sensor configured to measure the temperature of the heat transfer liquid, and a controller configured to control the main circulation pump based on temperature readings of the temperature sensor such that a calculated Reynolds number for the flow of heat transfer liquid is constant at a predetermined target Reynolds number over at least a primary temperature range.

12 Claims, 3 Drawing Sheets

(58) Field of Classification Search
CPC . F24D 3/10; F24D 5/12; F24D 11/006; F24D 3/18; F24D 5/02; F24D 11/002; F24D 11/0214; F24D 11/0257
USPC .................................. 237/8 A, 2 A, 63, 59
See application file for complete search history.

(56) References Cited

U.S. PATENT DOCUMENTS

| | | | |
|---|---|---|---|
| 2012/0175077 A1* | 7/2012 | Lehmann | E21B 17/046 |
| | | | 165/45 |
| 2012/0312545 A1* | 12/2012 | Suryanarayana | F24T 10/30 |
| | | | 166/57 |
| 2013/0118705 A1 | 5/2013 | Potter | |
| 2013/0234444 A1* | 9/2013 | Rogers | F24T 10/15 |
| | | | 165/45 |

FOREIGN PATENT DOCUMENTS

| | | | | |
|---|---|---|---|---|
| CN | 115183305 A | * | 10/2022 | ............. F28T 10/15 |
| DE | 1492360 | | 12/1969 | |
| DE | 102008018826 A1 | * | 10/2009 | ............ F24D 10/00 |
| JP | 2009063267 | | 3/2009 | |
| JP | 2014025658 A | * | 2/2014 | ................ F28F 1/08 |
| WO | WO-2015160279 A1 | * | 10/2015 | ............. F24D 12/02 |

OTHER PUBLICATIONS

International Search Report and Written Opinion of PCT/EP2019/066153, dated Sep. 3, 2019, in 13 pages.

\* cited by examiner

THERMAL HEATING SYSTEM AND A CONTROLLER FOR THE SAME

TECHNICAL FIELD

The present invention relates to a thermal heating system and a controller for the same.

BACKGROUND

Heat pumps are commonly used for heating and cooling purposes. Geothermal heating systems use a subterranean, or other, thermal storage to collect or deposit heat energy with the help of one or more heat exchangers and optional heat pumps.

Subterranean thermal storages may be portions of ground provided with deep bores through which a heat transfer liquid is pumped. Such thermal storages typically have a natural transfer of heat energy from surrounding ground and/or from subterranean water flows passing by the thermal storage. The natural supply of energy to the thermal storage thus provides for a good supply/removal of heat energy to/from the thermal storage.

For all types of thermal storages, a heat pump is typically used to increase energy exchange with the thermal storage.

A geothermal heat system thus at least comprises a thermal storage, a heat exchanger remote from said thermal storage, and a main circuit for routing heat transfer liquid to and from the thermal storage via the heat exchanger. The heat exchanger may be part of a heat pump. Also, several heat exchangers and optional connected heats pumps may be provided. Further, depending on the nature and design of the thermal storage a heat exchanger may be provided in the thermal storage too.

Geothermal heating may be used for energy exchange with residential heat exchangers or heat pumps to provide district heating or to provide air conditioning at a larger scale. Geothermal systems may be operated in different modes in order to provide indoor heat during cold months of the year or to provide indoor cooling during hot months of the year, or simply to provide for heating or cooling on demand, for example to refrigerators in stores.

Geothermal heating systems may be operated in different modes to heat or cool different portions of the system, typically to collect heat from a subterranean heat source or to collect or deposit heat through heat exchange with deep bores in the ground. Instead of subterranean heat exchange, other structures suitable for storage and exchange of heat energy could be used, such as water tanks above ground, mountains, lakes or sea water. Within this disclosure the term 'thermal storage' is used to refer to such structures. Further the term 'heating system' is used to refer to any system suitable for heating or cooling, since such system always heats one portion of the system whilst cooling another portion of the system.

There are several ways in which the operation of such a heating system is managed for different situations. Speed adjustment of circulation pumps is typically used to control the flow of heat transfer liquid in the systems and the speed adjustment is conventionally made based on a target difference in temperature or target difference in pressure as measured over an evaporator or a condenser of the system, wherein circulation in the system is adjusted to uphold the target difference.

A general goal of such speed adjustment is to reduce running cost of the system.

SUMMARY

A thermal heating and/or cooling system according to an aspect of the invention aims to further reduce running cost of a heating or cooling system comprising a heat exchanger. The thermal heating and/or cooling system comprises a thermal storage; at least one outer heat exchanger and a main circuit configured to route a flow of heat transfer liquid out of the thermal storage to the at least one outer heat exchanger and back to the thermal storage again. The at least one outer heat exchanger is connected to the main circuit outside of the thermal storage. Further, the system comprises a main circulation pump configured to force the heat transfer liquid through the main circuit, a temperature sensor configured to measure the temperature of the heat transfer liquid, and a controller configured to control the main circulation pump based on temperature readings of the temperature sensor such that a calculated Reynolds number for the flow of heat transfer liquid is constant at a predetermined target Reynolds number over at least a primary temperature range. By adapting the speed of the main circulation pump such that the Reynolds number at any given time is constant over time, a suitable level of turbulence can be maintained over time even though the temperature of the heat transfer liquid varies. Too much turbulence would increase power consumption of the system whilst too low turbulence would decrease heat transfer efficiency of the system.

The thermal storage may comprise a bore comprising a bore heat exchanger.

The controller may further be configured to base the control of the main circulation pump on a predetermined control curve, lookup table or function correlating temperature reading of the temperature sensor with target flow of heat transfer liquid for a given target Reynolds number. The control curve, lookup table or function is a convenient means of deriving a target flow based on a temperature reading of the temperature sensor.

The system may further comprise a flow rate sensor configured to measure flow rate in the main circuit, wherein the controller controls the speed of the main circulation pump to achieve a target flow rate determined by the flow rate sensor. By basing the control of the main circulation pump on measured flow rate, any deviations in flow rate between the flow rate corresponding to the main circulation pump speed will not affect the turbulence.

The flow rate sensor may be configured to measure flow rate in a return portion of the main circuit after the at least one outer heat exchanger.

The main circulation pump may be provided on a supply portion of the main circuit upstream of the outer heat exchanger. By positioning the pump upstream of the heat exchanger(s), the supply of pressurized heat transfer liquid to the heat exchangers is controllable independently of the individual circulation pumps of each outer heat exchanger. This improves reliability of the system.

The temperature sensor may be configured to measure temperature in a return portion of the main circuit downstream of the at least one outer heat exchanger. By measuring the temperature downstream of the heat exchanger(s), one can determine the temperature of heat transfer liquid entering the thermal storage, and so achieve a more accurate correlation between turbulence and pump speed.

The controller may further be configured to limit the speed of the main circulation pump to an operating range defined by a bottom speed and a top speed.

The bottom speed may be set such that the minimum flow rate of the main circuit is higher than the maximum total flow rate of the at least one outer heat exchanger(s). By keeping the minimum flow rate of the main circuit higher than the maximum total flow rate of the at least one outer heat exchanger(s), there is no risk that the supply of heat transfer liquid should not be high enough for the requirements of the outer heat exchangers.

The at least one outer heat exchanger may be configured to deliver comfort heating, or to deliver comfort cooling, or to deliver cooling of an industrial process.

According to another aspect a method for reducing power consumption and increasing heat transfer efficiency of a thermal heating and/or cooling system is provided. The thermal heating and/or cooling system comprises a thermal storage; at least one outer heat exchanger; a main circuit configured to route a flow of heat transfer liquid out of the thermal storage to the at least one outer heat exchanger and back to the thermal storage again; and a main circulation pump configured to force the heat transfer liquid through the main circuit. The method comprising: measuring a temperature of the heat transfer liquid; controlling the main circulation pump based on the measure temperature of the heat transfer liquid such that a calculated Reynolds number for the flow of heat transfer liquid is constant at a predetermined target Reynolds number over at least a primary temperature range, wherein the predetermined target Reynolds number is within the range of 2500-3500.

The temperature may be measured in a return portion of the main circuit downstream of the at least one outer heat exchanger.

The method may further comprise: measuring a flow rate in the main circuit; and controlling a speed of the main circulation pump such that a target flow rate is achieved.

The flow rate may be measured in a return portion of the main circuit after the at least one outer heat exchanger.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

A first embodiment of the system will be described with reference to FIG. 1. The system comprises a main circuit 2 for routing heat transfer liquid to and from a thermal storage 3. The thermal storage comprises a plurality of bores (not illustrated) into the ground. 17 bores are used, although a higher or lower number of bores could alternatively be used depending on for example ground characteristics and heat storage/retrieval capacity needs. Each bore is about 350 m deep but could have any suitable depth. Each bore is provided with a bore heat exchanger such as PE Dy50 mm PN10 SDR17. The heat transfer liquid may be any type of suitable heat transfer liquid. For this embodiment, the heat transfer liquid is brine comprising a mixture of coolant and 25% bioethanol.

Three outer heat exchangers 4a-c are connected to the main circuit 2 outside of the thermal storage 3 such that heat can be exchanged with the heat transfer liquid. In this embodiment, the three heat exchangers 4a-c are for comfort heating purposes, although the heat exchangers 4a-c in other embodiments could be for cooling purposes or for a mix of both heating and cooling in the case of several heat exchangers. The heat exchangers could be used together with respective compressors to form heat pumps.

Figure 1:
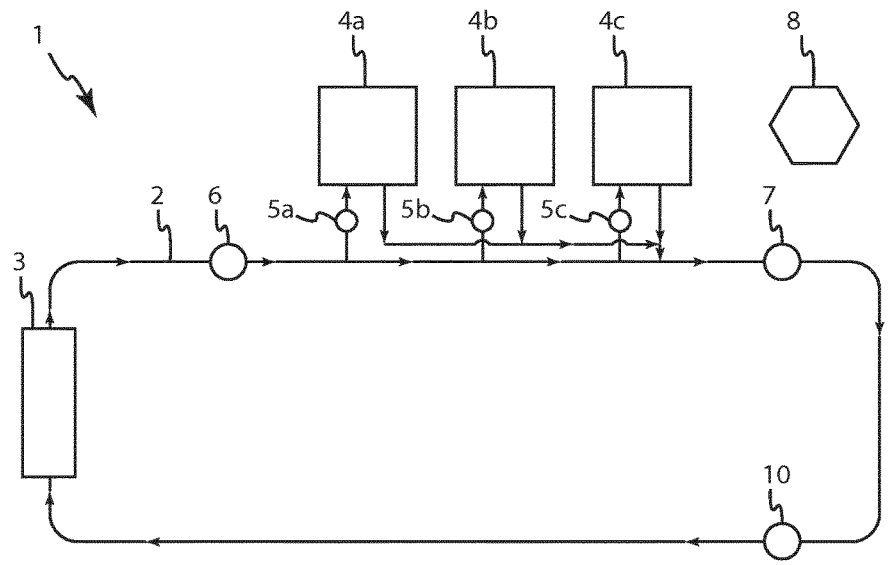
FIG. 1 shows a system according to a first embodiment.

Each outer heat exchanger 4a-c is connected to the main circuit 2 by means of a respective supply and return line forming a local circuit as schematically illustrated in FIG. 1. Each local circuit is provided with a respective local circulation pump 5a-c for controlling liquid flow through each heat exchanger 4a-c. The respective local circulation pump(s) 5a-c of the heat exchangers 4a-c are individually controllable such that the flow of heat transfer liquid taken from the main circuit 2 is controllable.

The system 1 also comprises a main circulation pump 6 configured to pump the heat transfer liquid through the main circuit 2. Also, the system 1 comprises a temperature sensor 7 configured to measure the temperature of the heat transfer liquid. In this embodiment the temperature sensor 7 is provided in a return portion of the main circuit, i.e. downstream of the heat exchangers 4a-c. Other positions of the temperature sensor could be used in other embodiments.

Further, the main circulation pump is provided on a supply portion of the main circuit upstream of the outer heat exchanger but could in other embodiments be positioned otherwise.

The system also comprises a controller 8 configured to control the main circulation pump 6 based on temperature readings of the temperature sensor 7 such that a calculated Reynolds number for the flow of heat transfer liquid is constant at a predetermined target Reynolds number over at least a primary temperature range. For example, a suitable target Reynolds number is chosen somewhere in the range of 2500 and 3500. Within that range, a turbulent flow can be expected in the system 1 without the flow being excessively turbulent such that energy would be lost. The system is normally operated within a wide range of brine temperature depending on system load and external parameters such as the amount and availability of energy in the energy storage. However, there may be good reasons not to keep increasing the pump speed and thus the flow rate, should the brine temperature drop below a specific temperature. For example, due to noise pollution, pump capacity and wear of the pump. Also, there may be good reasons not to keep decreasing pump speed and thus flow rate, should the brine temperature rise over a specific temperature. For example, too low flow rate in the main circuit would lead to problems as soon as one or more of the outer heat exchangers pump out more liquid from the main circuit 2 than what leaves the main circulation pump 6. Thus, the basic logic for controlling pump flow to keep Reynolds number constant over time applies at least to a primary operational range but not necessarily outside that range. Thus, in this embodiment the controller is further configured to limit the speed of the main circulation pump to an operating range defined by a bottom speed and a top speed, or by corresponding bottom and top flow rates.

Reynolds number and how to calculate it is commonly known in the art of fluid dynamics. All other variables being unchanged, a change in temperature must be met by a change in liquid flow if Reynolds number shall stay the same. An increase in liquid temperature corresponds to a need for decreased liquid flow and vice versa.

The controller 8 is further configured to base the control of the main circulation pump 6 on a predetermined control curve 9 which correlates the reading of the temperature sensor 7 with target flow of heat transfer liquid for the target Reynolds number discussed above. In other embodiments, a lookup table may be used instead of the control curve. Although many pump controllers are configured to operate based on a control curve governed by control points, a known mathematical relationship between fluid flow, temperature and Reynolds number could be used to implement a control function relating liquid temperature in the system with liquid flow in the system.

Thus, heat transfer liquid is circulated through the main circuit 2 past the bores of the thermal storage 3 where heat is transferred between the thermal storage 3 and the heat transfer liquid in the main circuit 2. The main circulation pump 6 ensures that the heat transfer liquid circulates from the thermal storage 3, through all connected outer heat exchangers 4a-c and back to the thermal storage 3. Of course, individual heat exchangers 4a-c could in some embodiments be disconnectable when not in use, such as by stopping a respective local circulation pump 5a-c or by a closing a respective valve thereby preventing or limiting flow through the respective outer heat exchanger 4a-c. The controller applies its logic, as discussed above, to ensure a turbulent and energy efficient liquid flow through the system over time by measuring liquid temperature and adapting liquid flow rate accordingly.

The system 1 further comprises a flow rate sensor 10 configured to measure flow rate in the main circuit 2, wherein the controller 8 controls the speed of the main circulation pump 6 to achieve a target flow rate as measured by the flow rate sensor 10.

By measuring the flow rate, real flow rate can be determined, whereas the alternative would be to use a calculated flow rate, for example calculated based on knowledge about the pumping characteristics of the main circulation pump 6 and of the control signal fed to the main circulation pump 6. The flow rate sensor 10 is positioned in a return portion of the main circuit after the outer heat exchangers but could however in other embodiments be otherwise positioned as long as it provides a signal indicative of the liquid flow rate of interest. For example, in some systems it may be known that the flow rate upstream of the outer heat exchangers or within the thermal storage is substantially the same as the flow rate downstream of the outer heat exchanger.

Preferably, the controller 8 is configured to keep the flow in the system 1 balanced such that the flow out of the main circuit 2 caused by the local circulation pumps 5a-c is not higher than the flow of liquid leaving the main circulation pump 6. In other words, the controller 8 is configured to control the main circulation pump 6 such that the minimum flow of the main circulation pump 6 equals or exceeds the maximum flow of the local circulation pumps 5a-c of the outer heat exchangers 4a-c. This can be seen in the diagram as a flattening of the flow rate above 10 degrees centigrade. This leads to a slight increase of Reynolds number above 10 degrees centigrade.

In another embodiment, similar to the one described above, the thermal storage 3 instead comprises 44 bores in the ground, each bore having a length of 120 m. In this embodiment, a PE Dy40 mm PN10 SDR17 bore heat exchanger is provided instead of the other bore heat exchanger. Also, the outer heat exchangers are not for heating but for cooling.

Figure 2:
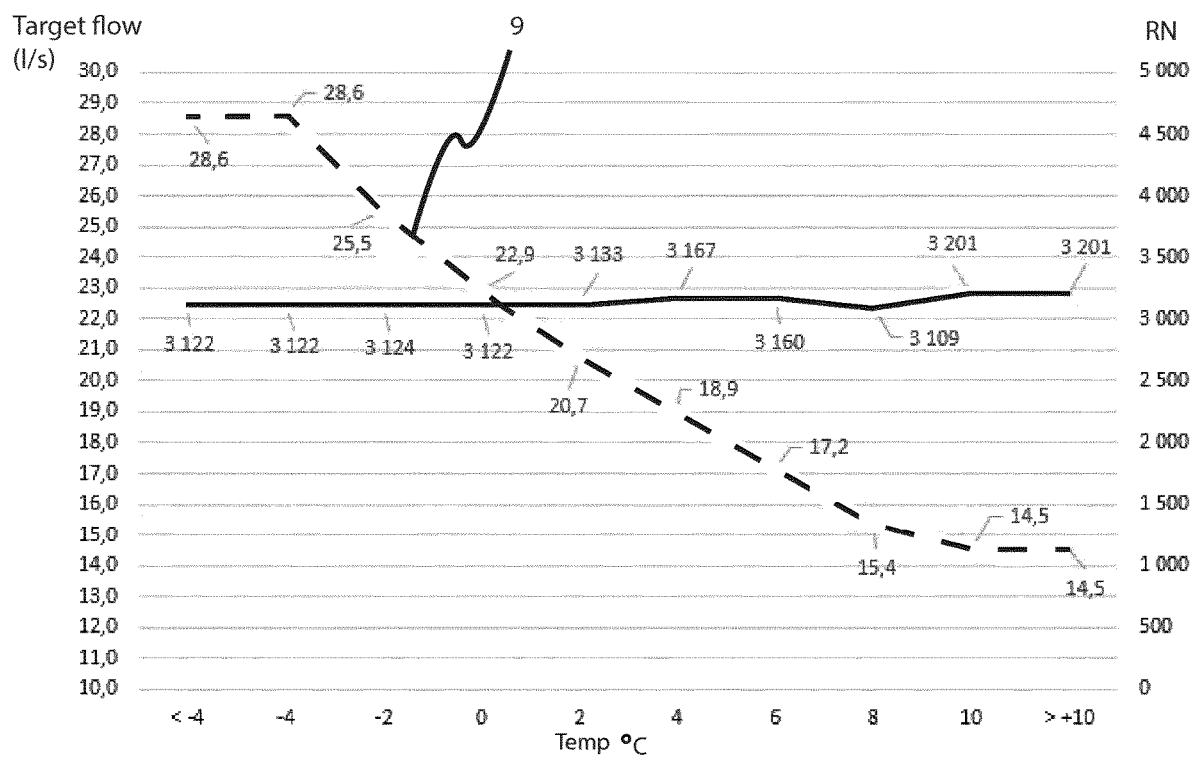
FIG. 2 shows a control curve for controlling a system according to a second embodiment.

FIG. 2 illustrates, for the system of the embodiment comprising 44 bores, a calculated Reynolds numbers and measured flow for temperatures between −4 and +10 degrees centigrade, the primary operating range of choice. As shown, it is possible to keep Reynolds number constant over a large range of temperatures of the heat transfer liquid. Within the context of this disclosure, the meaning of constant is to be interpreted broadly as being within +−5% of a target Reynolds number.

Further, the system may in an embodiment also be connected to a comfort cooling system of a building or to heating or cooling in an industrial process.

As known in the art, the Reynolds number is defined as:

$$\text{Re} = \frac{\rho u L}{\mu} = \frac{uL}{\nu}$$

where:
ρ is the density of the fluid (SI units: kg/m³)
u is the velocity of the fluid with respect to the object (m/s)
L is a characteristic linear dimension (m)
μ is the dynamic viscosity of the fluid (Pa·s or N·s/m² or kg/m·s)
ν is the kinematic viscosity of the fluid (m²/s).

At installation and setup of the system a suitable Reynolds number for the system is decided upon based on experience—typically within the range of 2500-3500, indicating a suitable turbulence. A number of respective target flow rates corresponding to respective temperatures of the heat transfer liquid are then calculated for the system 1 or for a suitable portion of the system 1 in which the turbulence is of interest, such as within the bore hole heat exchangers of the thermal storage 3. Since the materials, shapes and bends of the main circuit 2 outside and inside the thermal storage 3 may vary, average values have to be used taking due care of these varying characteristics. For example, a flow rate can be calculated as follows:

target flow=u=f(temperature of heat transfer liquid)= $(Re*v)/L=(Re*\mu)/(\rho*\mu)$ where some of these parameters depend on the fluid mixture used and on its temperature, as the person skilled in the art will understand.

A curve can then be derived using the derives temperature/flow pairs using linear interpolation between the known points, as shown in FIG. 2 or using some other interpolation technique for a smoother curve.

A maximum allowed flow for the main circuit is established based on the constraints of the given system, such as number and depth of bores and energy outtake or charging capacity from/to the thermal storage. Also, a maximum allowed flow for the local circuits of heat exchangers connected to the main circuit is established based on at least the maximum flow of the main circuit such that there is balance of flows within the main circuit.

Figure 3:
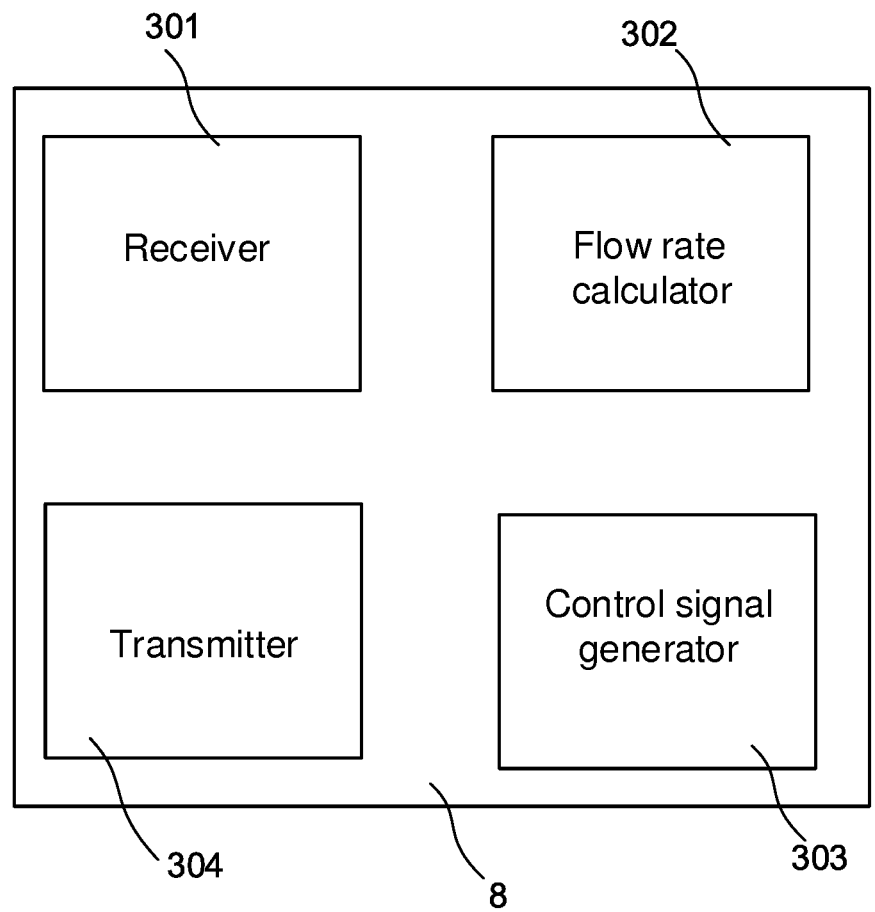
FIG. 3 shows a controller configured for controlling a system according to an embodiment.

According to an aspect, a controller 8 is provided for managing systems similar to those of discussed above. The controller 8 is thus configured to control a main circulation pump 6 configured to force heat transfer liquid through a main circuit 2 for routing a flow of heat transfer liquid out of a thermal storage 3 to at least one outer heat exchanger 4a, 4b, 4c and back to the thermal storage 3 again. The controller 8 will be discussed in connection with FIG. 3. The controller 8 comprises a receiver 301, a flow rate calculator 302, a control signal generator 303 and a transmitter 304.

The receiver 301 is configured to receive a temperature reading from a temperature sensor 7 configured to measure the temperature of the heat transfer liquid of the main circuit 2.

The flow rate calculator 302 is configured to, based on the temperature reading, calculate a flow rate for the heat transfer liquid of the main circuit 2 such that a calculated Reynolds number for the flow of heat transfer liquid is constant at a predetermined target Reynolds number over at least a primary temperature range, wherein the predetermined target Reynolds number is within the range of 2500-3500.

The control signal generator 303 is configured to, based on the target flow rate, generate a control signal for the main circulation pump 2, the control signal comprising information pertaining to the calculated target flow rate at which the pump is to operate.

The transmitter 304 configured to send the control signal to the main circulation pump 2.

The control signal generator 303 may further be configured to base the generation of the control signal on a predetermined control curve, a lookup table or a function correlating the temperature reading with target flow rate of heat transfer liquid for a given target Reynolds number. In an embodiment, the receiver 301 is further configured to receive a flow rate reading from a flow rate sensor 10 configured to measure a flow rate in the main circuit 2, wherein the control signal generator 303 is further configured to base the generation of the control signal on the flow rate reading.

The controller 8 could be used to upgrade existing installations for more efficient operation provided the relevant temperature and optional flow sensor is provided.

Figure 4:
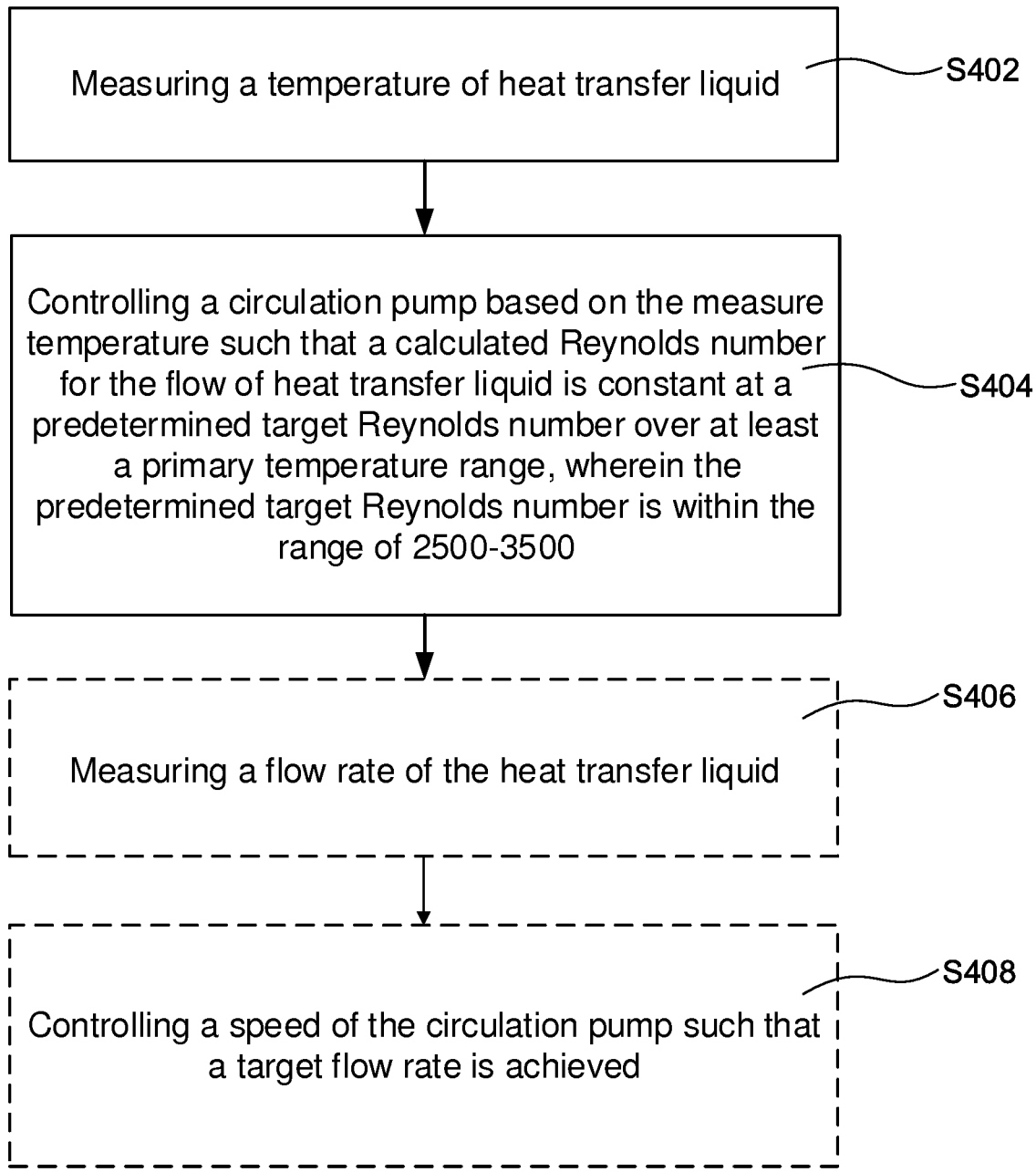
FIG. 4 shows a method for reducing power consumption and increasing heat transfer efficiency of a system according to an embodiment.

In connection with FIG. 4 a method for reducing power consumption and increasing heat transfer efficiency of the thermal heating and/or cooling system discussed above will be discussed. Hence, the thermal heating and/or cooling system comprising: a thermal storage (3); at least one outer heat exchanger (4a-c); a main circuit (2) configured to route a flow of heat transfer liquid out of the thermal storage (3) to the at least one outer heat exchanger (4a-c) and back to the thermal storage (3) again; and a main circulation pump (6) configured to force the heat transfer liquid through the main circuit (3). The method comprises one or more of the following acts. The acts may be performed in any order suitable.

Measuring S402 a temperature of the heat transfer liquid. The temperature may be measured in a return portion of the main circuit (2) downstream of the at least one outer heat exchanger (4a-c).

Controlling S404 the main circulation pump (6) based on the measure temperature of the heat transfer liquid such that a calculated Reynolds number for the flow of heat transfer liquid is constant at a predetermined target Reynolds number over at least a primary temperature range, wherein the predetermined target Reynolds number is within the range of 2500-3500.

The method may further comprise measuring S406 a flow rate in the main circuit (2). The flow rate may be measured in a return portion of the main circuit (2) after the at least one outer heat exchanger (4a-c).

The method may further comprise controlling S408 a speed of the main circulation pump (6) such that a target flow rate is achieved.

The invention claimed is:

1. A geothermal heating and/or cooling system comprising:
   a geothermal storage;
   at least one outer heat exchanger;
   a main circuit configured to route a flow of heat transfer liquid out of the geothermal storage to the at least one outer heat exchanger and back to the geothermal storage again;
   a main circulation pump configured to force the heat transfer liquid through the main circuit;
   a temperature sensor configured to measure the temperature of the heat transfer liquid;
   a flow rate sensor configured to measure flow rate in a return portion of the main circuit after the at least one outer heat exchanger; and
   a controller configured to control the main circulation pump based on temperature readings of the temperature sensor such that a calculated Reynolds number for the flow of heat transfer liquid is constant at a predetermined target Reynolds number over at least a primary temperature range, wherein the predetermined target Reynolds number is within the range of 2500-3500 such that turbulent flow of the heat transfer liquid is achieved,
   wherein the controller is configured to control a speed of the main circulation pump to achieve a target flow rate measured by the flow rate sensor in a return portion of the main circuit after the at least one outer heat exchanger, and wherein the controller is further configured to base the control of the main circulation pump on a predetermined control curve, lookup table or function correlating temperature reading of the temperature sensor with target flow of heat transfer liquid for a given target Reynolds number.

2. The system according to claim 1, wherein the geothermal storage comprises a bore comprising a bore heat exchanger.

3. The system according to claim 1, wherein the main circulation pump is provided on a supply portion of the main circuit upstream of the at least one outer heat exchanger.

4. The system according to claim 1, wherein the temperature sensor is configured to measure temperature in a return portion of the main circuit downstream of the at least one outer heat exchanger.

5. The system according to claim 1, wherein the controller is further configured to limit the speed of the main circulation pump to an operating range defined by a bottom speed and a top speed.

6. The system according to claim 5, wherein the bottom speed is set such that a minimum flow rate of the main circuit is higher than a maximum total flow rate of the at least one outer heat exchanger.

7. The system according to claim 1, wherein the at least one outer heat exchanger is configured to deliver comfort heating.

8. The system according to claim 1, wherein the at least one outer heat exchanger is configured to deliver comfort cooling.

9. The system according to claim 1, wherein the at least one outer heat exchanger is configured to deliver cooling of an industrial process.

10. A controller configured to control a main circulation pump configured to force heat transfer liquid through a main circuit for routing a flow of heat transfer liquid out of a geothermal storage to at least one outer heat exchanger and back to the geothermal storage again, the controller comprising:
    a receiver configured to receive a temperature reading from a temperature sensor configured to measure the temperature of the heat transfer liquid of the main circuit;
    a flow rate calculator configured to, based on the temperature reading, calculate a flow rate for the heat transfer liquid of the main circuit such that a calculated Reynolds number for the flow of heat transfer liquid is constant at a predetermined target Reynolds number over at least a primary temperature range, wherein the predetermined target Reynolds number is within the range of 2500-3500 such that turbulent flow of the heat transfer liquid is achieved;
    a control signal generator configured to, based on the target flow rate, generate a control signal for the main circulation pump, the control signal comprising information pertaining to the calculated target flow rate at which the main circulation pump is to operate, wherein the control signal generator is further configured to base the generation of the control signal on a predetermined control curve, a lookup table or a function correlating the temperature reading with target flow rate of heat transfer liquid for a given target Reynolds number; and
    a transmitter configured to send the control signal to the main circulation pump, wherein the receiver is further configured to receive a flow rate reading from a flow rate sensor configured to measure a flow rate in the main circuit, wherein the control signal generator is further configured to base the generation of the control signal on the flow rate reading.

11. A method for reducing power consumption and increasing heat transfer efficiency of a geothermal heating and/or cooling system comprising:
    a geothermal storage;
    at least one outer heat exchanger;
    a main circuit configured to route a flow of heat transfer liquid out of the geothermal storage to the at least one outer heat exchanger and back to the geothermal storage again; and
    a main circulation pump configured to force the heat transfer liquid through the main circuit, the method comprising:
    measuring a temperature of the heat transfer liquid;
    measuring a flow rate in a return portion of the main circuit after the at least one outer heat exchanger;
    controlling the main circulation pump based on the measured temperature of the heat transfer liquid such that a calculated Reynolds number for the flow of heat transfer liquid is constant at a predetermined target Reynolds number over at least a primary temperature range, wherein the predetermined target Reynolds number is within the range of 2500-3500 such that turbulent flow of the heat transfer liquid is achieved; and
    controlling a speed of the main circulation pump such that a target flow rate is achieved,
    wherein the controlling of the main circulation pump is based on a predetermined control curve, lookup table or function correlating temperature reading of a temperature sensor with target flow of heat transfer liquid for a given target Reynolds number.

12. The method according to claim 11, wherein the temperature is measured in a return portion of the main circuit downstream of the at least one outer heat exchanger.

* * * * *